April 18, 1944.    H. J. DEMPSEY    2,346,734
REFINING OF MINERAL OIL
Filed March 22, 1941
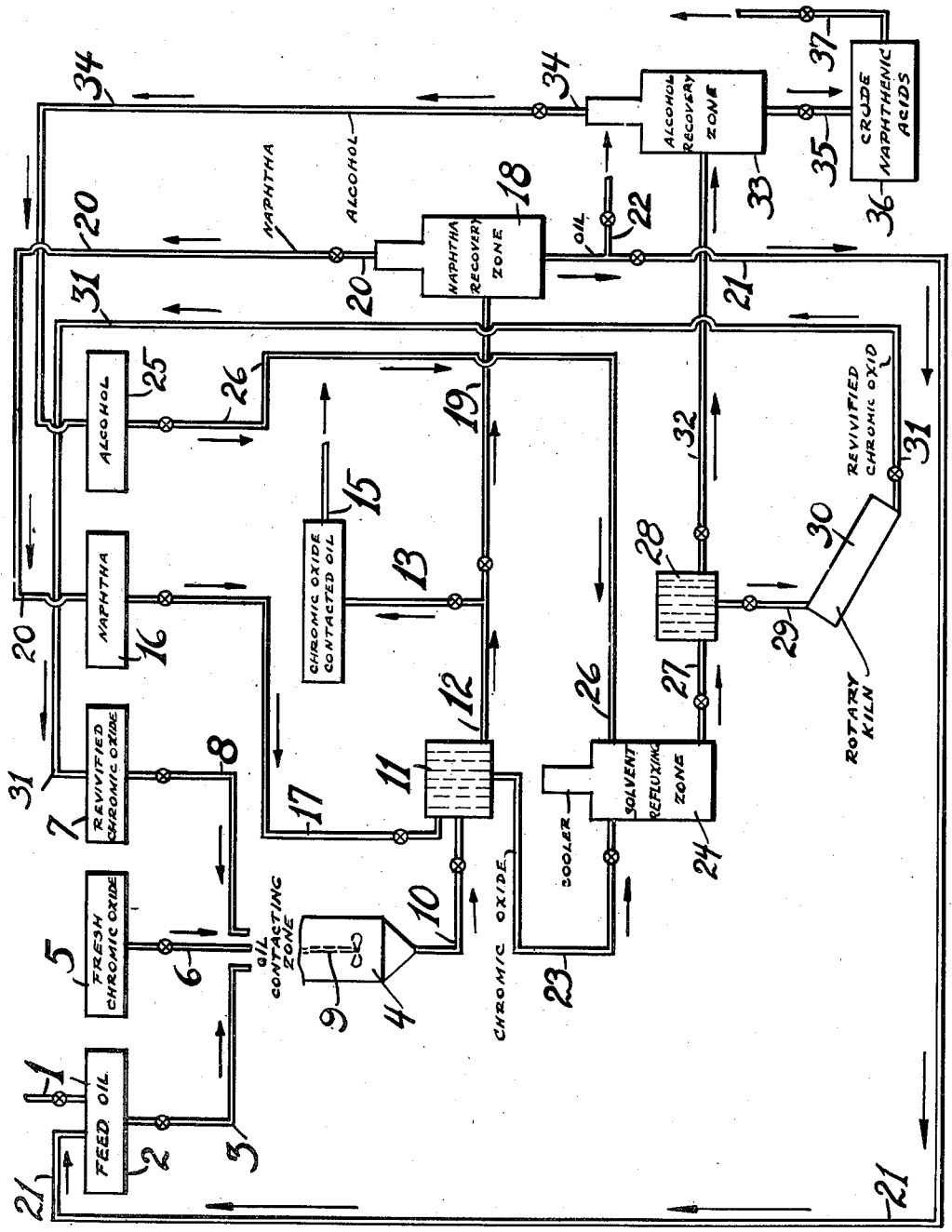
Henry J. Dempsey Inventor
By P. L. Young Attorney Patented Apr. 18, 1944

2,346,734

UNITED STATES PATENT OFFICE 2,346,734

REFINING OF MINERAL OILS

Henry J. Dempsey, Elizabeth, N. J., assignor to Standard Oil Development Company, a corporation of Delaware Application March 22, 1941, Serial No. 384,693

3 Claims. (Cl. 260—514)

The present invention is concerned with refining of mineral oils. The invention especially relates to the refining of petroleum oils for the removal of objectionable color bodies therefrom and for the segregation and recovery of naturally occurring naphthenic acids. In accordance with the present process feed oils, particularly petroleum oils, are contacted under definite temperature conditions with a catalyst comprising chromic oxide.

It is known in the art to refine petroleum oils for the production of high quality products by various procedures. In these operations it is known to remove objectionable color bodies from the oil, for example, by treating the same with various absorbents such as bauxite, zeolite, contacting clays and the like. Furthermore, in various refining operations in which it is desired to secure a rearrangement of the molecular structure or a cracking of the oil constituents it is known to use various other catalysts which promote these reactions.

I have now discovered a substance which is particularly desirable for utilization in decolorization operations providing the temperature conditions be controlled within a certain critical temperature range and which is especially adapted for the segregation and recovery of naturally occurring naphthenic acids present in the feed oil.

The process of my invention may be readily understood by reference to the drawing illustrating one embodiment of the same. For purposes of illustration it is assumed that the feed oil comprises a petroleum oil boiling in the lubricating oil boiling range. The feed oil is introduced into feed oil storage zone 2 by means of line 1, from where it is withdrawn by means of line 3 and passed to oil contacting zone 4. In contacting zone 4 the oil is treated with fresh chromic oxide which is withdrawn from zone 5 and introduced by means of line 6 with chromic oxide which is withdrawn from zone 7 into contacting zone 4 by means of line 8. Temperature and pressure conditions are adjusted in zone 4 to secure the desired decolorization of the feed oil and to secure the desired removal of naphthenic acid constituents from the same. Adequate mixing of the chromic oxide and oil is secured in zone 4 by utilizing agitating means 9.

The chromic oxide contacted oil is withdrawn from treating zone 4 by means of line 10 and passed into separating means 11, which may comprise any suitable means adapted to secure separation between the treated oil and the chromic oxide. For purposes of description the separation means is shown to be a conventional type filter. The chromic oxide contacted oil is withdrawn from filtering zone 11 by means of line 12 and passed to chromic oxide contacted oil storage zone 14 by means of line 13. From this zone the treated product is withdrawn by means of line 15 and further handled or refined in any manner desirable.

After the oil has been removed from the chromic oxide, the chromic oxide in filtering zone 11 is washed with a suitable solvent adapted to remove entrained oil particles from the chromic oxide. The solvent employed is selected from the class of solvents which will remove the oily constituents from the chromic oxide and which will have substantially no effect on the color bodies and naphthenic acid constituents retained by the chromic oxide. For purposes of description, the solvent is taken to be a light petroleum naphtha which is withdrawn from storage zone 16 and introduced into filtering zone 11 by means of line 17. The solution of naphtha and oily constituents removed in this washing operation is passed to naphtha recovery zone 18 by means of line 19 wherein temperature and pressure conditions are adjusted to remove the light naphtha overhead by means of line 20. The naphtha is returned to naphtha storage 16 and recycled to the system. The higher boiling oil constituents removed from the chromic oxide by means of the naphtha is withdrawn from naphtha recovery zone 18 by means of line 21 and preferably recycled with the fresh feed oil by passing the same to feed oil storage 2. However, in certain operations this oil may be withdrawn from the system by means of line 22 and handled as desired or combined with the treated oil product removed by means of line 15.

Spent chromic oxide containing adhered thereon color bodies and naphthenic acid constituents is withdrawn from separation zone 11 by means of line 23 and passed to a solvent refluxing zone 24. In solvent refluxing zone 24 the spent chromic oxide is treated with a solvent under conditions adapted to dissolve in the solvent the naphthenic acids to the exclusion of the color bodies. For the purpose of description it is assumed that the solvent comprises methyl alcohol which is withdrawn from alcohol storage 25 and introduced into solvent refluxing zone 24 by means of line 26. In zone 24 the chromic oxide is refluxed preferably at the boiling point of the alcohol for a time period sufficient to dissolve in the alcohol the naphthenic acids. After a sufficient time period the mixture is withdrawn from zone 24 by means of line 27, and passed through separating means 28 wherein the chromic oxide is separated from the alcoholic solution of naphthenic acids.

The chromic oxide is withdrawn from separating means 28 by means of line 29 and passed to a rotary kiln or equivalent means 30 wherein the chromic oxide is completely revivified preferably by burning the same. The revivified chromic oxide is withdrawn from rotary kiln 30 by means of line 31 and recycled to storage zone 7. The alcoholic solution comprising naphthenic acids is withdrawn from separating means 28 by means of line 32 and passed to alcohol recovery zone 33 wherein the alcohol is separated from the crude naphthenic acids, removed overhead by means of line 34, and recycled to storage zone 25. The crude naphthenic acids are withdrawn from recovery zone 33 by means of line 35, passed to crude naphthenic acid storage 36 and withdrawn from the system by means of line 37. These acids withdrawn from the system by means of line 37 may be further refined for the production of refined naphthenic acids or for the segregation of particular naphthenic acids by methods known in the art, such as by esterification operations or by utilizing operations involving the formation of salts.

It is to be understood that the present process may be widely varied. The operation may comprise a percolation operation, a batch stage treating operation, or a slurry of the chromic oxide may be employed. My invention essentially comprises contacting a feed oil with a chromic oxide catalyst at a temperature in the range below about 200° F. preferably at a temperature in the range from about 100° F. to 150° F. The operation generally is carried out under pressure conditions adapted to maintain the oil being treated in the liquid phase. In general, atmospheric pressure has been found to be entirely satisfactory.

The chromic oxide utilized may be of any particle size. As pointed out before, a slurry of the chromic oxide may be employed or a powdered chromic oxide catalyst utilized. Under certain conditions it is desirable to employ the chromic oxide in conjunction with other absorbents. The amount of chromic oxide used may vary considerably and will depend upon the character of the feed oil. In general, it is preferred to employ from about 2 pounds to 10 pounds of chromic oxide per gallon of oil, preferably from about 4 pounds to 8 pounds, and to regulate the contact time from about two to ten minutes. In general, it is desirable to have the contact time below about five minutes.

My process may be adapted for the removal of color bodies from any feed oil containing the same and for the removal and recovery of naphthenic acid constituents. It is particularly applicable in the treatment of petroleum oils boiling in the heating oil and lubricating oil boiling ranges. The spent chromic oxide may be regenerated by burning or by utilizing any suitable means, such as by washing with various solvents, as for example, liquefied normally gaseous hydrocarbons, light naphthas, or oxygenated substances such as various alcohols, ketones, and the like. The washing operation may be combined with a burning operation. In accordance with a preferred adaptation of the invention in which it is desired to segregate relatively pure naphthenic acid constituents, the chromic oxide is regenerated by solvent treating the same, which treatment is preferably followed by a burning operation.

In this latter operation it is preferred that the spent chromic oxide be treated in an initial stage with a primary solvent as, for example, light naphthas, liquefied normally gaseous hydrocarbons, such as propane, butane, and the like. The solvents used in this stage are selected from the general class of solvents which are characterized by having a preferential selectivity for the oil constituents as compared to the color bodies and naphthenic acid constituents. The amount of primary solvent used is adjusted substantially to free the chromic oxide of oily constituents and to effect substantially no removal of the naphthenic acids and color bodies from the chromic oxide.

The chromic oxide after separation from the primary solvent is then contacted with a secondary solvent having a preferential selectivity for the naphthenic acid constituents as compared to the color bodies. In general, oxygenated solvents of the class of alcohols and ketones are preferred. Especially desirable solvents are the relatively low boiling alcohols such as methyl and ethyl alcohol. When employing a solvent of this character it is preferred to reflux the chromic oxide with the solvent for a sufficient time period. In general, this time period is in the range from about 15 to 45 minutes. The amount of secondary solvent employed will vary widely depending upon the general operating conditions. However, I have found that it is desirable to employ from about 0.5 to 4.0 volumes of secondary solvent per volume of chromic oxide. Under these conditions, an appreciable quantity of the color bodies are retained on the chromic oxide and are subsequently removed therefrom by burning.

In order to illustrate the invention further, the following examples are given which should not be construed as limiting the same in any way whatsoever.

*Example 1*

A Pennsylvania oil having a Saybolt viscosity in the range from about 100 to 200 was contacted with chromic oxide under the following conditions with the following results:

| Adsorbent | $Cr_2O_4$ | $Cr_2O_3$ | Fuller's earth fines. |
|---|---|---|---|
| Adsorbents, lbs./gal. | 1.67 | 1.67 | 1.67. |
| Adsorbent age | Fresh | Fresh | Fresh. |
| Contact temp. °F. | 350 | 150 | 300. |
| Contact time minutes | 5 | 5 | 5. |
| Tag Robinson color of contacted oil | 5 | 8½ | 9. |

From the above it is apparent that although 300° F. will produce satisfactory results when utilizing fuller's earth, a temperature in this range when using chromic oxide is entirely unsatisfactory. It is also evident that relatively low temperatures must be employed when decolorizing the petroleum oil with chromic oxide in accordance with the present process.

*Example 2*

A feed oil derived from a Colombian crude oil and boiling in the lubricating oil boiling range was contacted with about three pounds of chromic oxide per gallon of oil at a temperature of about 150° F. and at a contact time of about five minutes, with results as follows:

| | Oil before contacting | Oil after contacting |
|---|---|---|
| Gravity, °A. P. I. | 31.0 | 31.2 |
| Open cup flash (A. S. T. M.) °F. | 295 | 295 |
| Saybolt Universal viscosity 100° F. | 57 | 56 |
| Pour point °F. | −40 | −40 |
| Color, Tag Robinson | 3.5 | 7.0 |
| Neutralization number (A. S. T. M.) | 2.92 | 2.01 |
| Naphthenic acid content per cent | 1.8 | 1.2 |

From the above, it is apparent that an appreciable removal of color bodies was secured from the oil, and that naphthenic acid constituents were likewise removed.

In the above operation based upon 1000 volumes of oil contacted, the results were as follows:

|  | Volume | Neutralization number | Naphthenic acid by volume |
|---|---|---|---|
|  |  |  | Per cent |
| Oil to contacting units | 1,000 | 292 | 1.8 |
| Oil from contacting units | 940 | 201 | 1.2 |

The amount of catalyst utilized in contacting this volume of oil was removed from the contacting unit and washed with a narrow boiling range light naphtha having a gravity of about 57° A. P. I., and boiling in the range from about 210° F. to 310° F. This mixture was refluxed and an oily layer recovered as follows:

|  | Volume | Neutralization number | Naphthenic acid by volume |
|---|---|---|---|
|  |  |  | Per cent |
| Oil recovered | 55 | 2.3 | 1.4 |

The chromic oxide was dried, washed with 95% methyl alcohol, and again refluxed. An oily layer was secured as follows:

|  | Volume | Neutralization number | Naphthenic acid by volume |
|---|---|---|---|
|  |  |  | Per cent |
| Layer recovered | 2.6 | 107 | 67 |

The catalyst was then washed with benzol, dried, and the combustible matter determined. The combustible matter was 0.26%.

From the above, it is apparent that by operating as described it is possible to segregate a crude naphthenic acid fraction which may be readily processed into refined naphthenic acids.

What I claim as new and wish to protect by Letters Patent is:

1. Process for the removal and recovery of naphthenic acid constituents from a mineral oil containing the same, which comprises contacting said mineral oil at a temperature in the range from about 100° F. to about 200° F. in the liquid state with a catalyst comprising as the essential active ingredient chromic oxide, segregating said chromic oxide, and contacting the same with a primary solvent having the ability to remove therefrom oily constituents and color bodies, separating the treated chromic oxide and contacting the same with a secondary oxygenated solvent selected from the class consisting of ketones and alcohols whereby the naphthenic acid constituents are removed, removing the secondary solvent containing the naphthenic acid constituents and recovering the naphthenic acid constituents therefrom.

2. Process as defined by claim 1 in which said primary solvent comprises a low boiling petroleum hydrocarbon and in which said secondary solvent comprises a ketone.

3. Process as defined by claim 1, in which said primary solvent comprises a liquefied normally gaseous hydrocarbon, and in which said secondary solvent comprises an alcohol.

HENRY J. DEMPSEY.